Nov. 23, 1965     JAMES E. WEBB     3,219,365
ADMINISTRATOR OF THE NATIONAL AERONAUTICS
AND SPACE ADMINISTRATION
SPHERICAL SHIELD
Filed Nov. 2, 1964
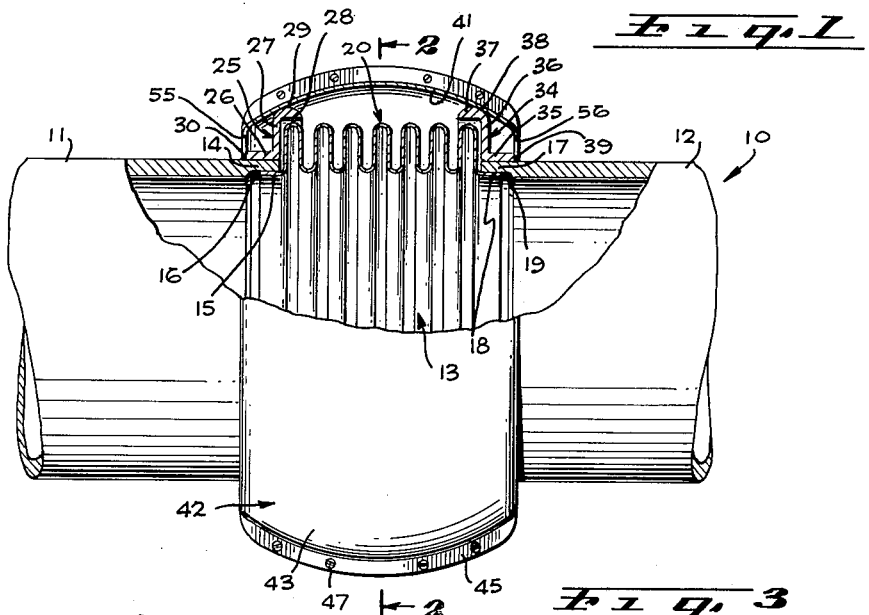
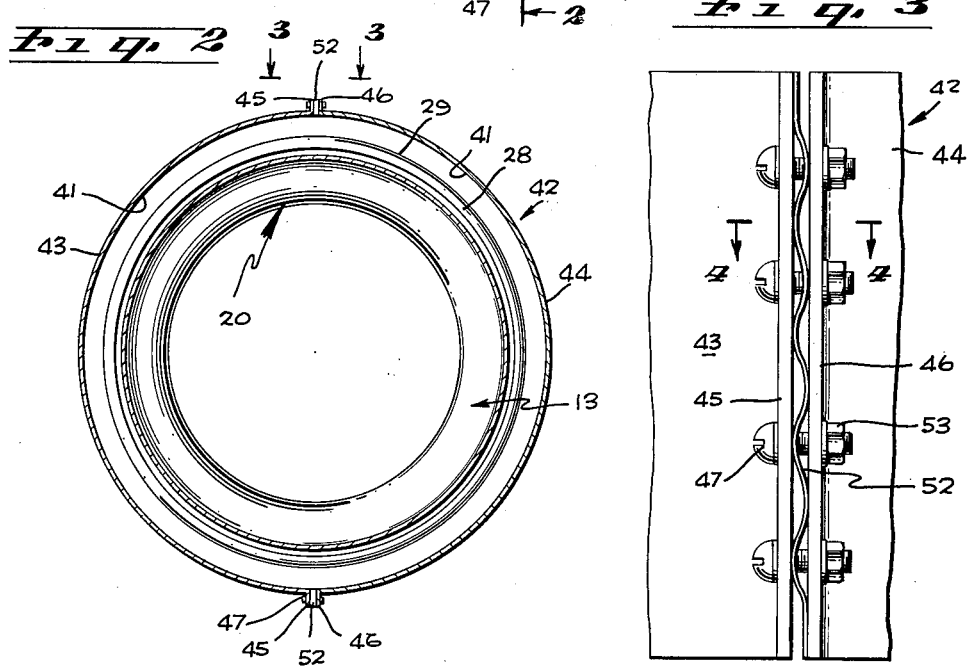
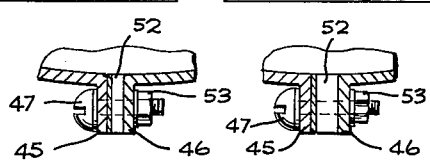
INVENTORS
SHELDON J. NOREEN
ROBERT O. PFLEGER
BY
ATTORNEY

United States Patent Office 3,219,365
Patented Nov. 23, 1965

3,219,365
SPHERICAL SHIELD
James E. Webb, Administrator of the National Aeronautics and Space Administration with respect to an invention of Sheldon J. Noreen, 23334 Collins St., Woodland Hills, Calif., and Robert O. Pfleger, P.O. Box 624, Tarzana, Calif.
Filed Nov. 2, 1964, Ser. No. 408,435
3 Claims. (Cl. 285—45)

This invention relates to a shield device for bellows joints and more particularly to a shield device that protects the joint while permitting gimbal and axial movement of the members of the joint.

In conduits carrying high pressure fluids, such as propellant lines, it is necessary to place bellows at the joints where movement will take place. These bellows have a relatively thin wall thickness and are sensitive to scratches and dents so that it is important that these bellows be protected by a shield while permitting the bellows to function as a flexible connection.

The present invention provides a relatively low cost shield device which gives maximum protection against damaging effects of scratches and dents which reduces the cycle life of the bellows. The shield device of the present invention is made of a spherical shaped sleeve which is longitudinally split in half and the two halves have edge flanges which are bolted together. A marcel spring type spacer is inserted between each pair of flanges to hold the flanges apart. The shield surrounds the bellows which connects the adjacent ends of two conduit sections and a support ring is secured to each end of the conduit to support the shield in spaced relationship to the bellows. Each ring has an arcuate upper surface extending over the first convolution on each end of the bellows, and engaging the inner spherical surface of the shield. Therefore, each conduit section can gimbal into any angular plane with respect to the shield and vary the angle formed between the longitudinal axes of the conduit section. Also, by loosening or tightening the bolts against the Marcel spring type spacers between the flanges, the size of the shield can be varied thereby permitting axial lengthening or shortening of the joint. In addition to permitting gimbal movement of the joint and axial adjustment, the shield device continually protects the complete bellows and carries axial tension loads which may be placed upon the joint, during assembly, transport and use of the joint.

It is, therefore, an object of the present invention to provide a shield device for bellows joints which consists of a sleeve surrounding the bellows joint and supported by the joined conduit section to provide a ball joint action for each conduit section.

Another object of the invention is to provide a shield device for bellows joints which permits angular movement between the conduit sections of the joint and also permits axial length adjustment between the adjacent ends of the conduit sections.

Another object of the invention is to provide a shield device for bellows joints which protects the joint and carries axial tension loads on the joint.

A further object of the invention is to provide a shield device for bellows joints which consists of a longitudinally split sleeve having an inner spherical surface engaged by a circular support ring carried by each conduit section connected by the bellows.

These and other objects of the invention not specifically set forth above become readily apparent from the accompanying description of drawings in which:

FIGURE 1 is an elevational view partly in section showing a bellows extending between the adjacent ends of conduit sections and support rings attached to adjacent ends of the conduit section for supporting the shield.

FIGURE 2 is a transverse vertical section along line 2—2 of FIGURE 1 showing longitudinal flanges on the shield halves;

FIGURE 3 is a top plan view along line 3—3 of FIGURE 2 of a portion of a flange connection between the halves of the shield;

FIGURE 4 is a section along line 4—4 of FIGURE 3 showing the Marcel spring type spacer between the flanges; and FIGURE 5 is a section similar to FIGURE 4 showing the spring spacer expanded to increase the axial length of the joint.

Referring to the embodiment of the invention chosen for purposes of illustration, a conduit 10 has conduit sections 11 and 12 joined together at adjacent ends by bellows 13. The end 14 of section 11 has its inner surface enlarged to receive end 15 of the bellows 13 and the end 15 can be welded to the conduit section at location 16. End 17 of the conduit section 12 has its inner surface enlarged to receive end 18 of the bellows 13 which can be soldered to the conduit section at location 19. The bellows 13 has a plurality of convolution 20 extending between ends 15 and 18 in order to provide flexibility for the conduit 10 between the sections 11 and 12 while retaining a fluid type connection between the two sections.

A support ring 25 has a band 26 around end 14 of conduit section 11 and has an outwardly extending flange 27 which terminates in a band 28 having an arcuate surface 29. The support ring 25 is welded at location 30 to the conduit end 14 to fix the support ring with respect to the conduit section 11. In a similar manner, a second support ring 34 has an axially extending band 35 around end 17 of conduit section 12 and has an outwardly extending flange 36 terminating in an axially extending band 37 having an arcuate surface 38. The band 35 is welded to the end 17 at location 39 in order to fix the support ring 34 with respect to the conduit section 12. The bands 28 and 37 extend axially beyond the conduit ends 14 and 17, respectively, and surround the end convolutions of the bellows 20 while providing sufficient space to permit normal flexing of the bellows.

A cover or shield 42 is split horizontally into two halves 43 and 44 and has an inner surface 41 which is spherical in contour. The half 43 has a pair of outwardly extending flanges 45 while the half 44 has a pair of outwardly extending flanges 46. The halves 43 and 44 are held together by a plurality of bolts 47 passing through the flanges 45 and 46. The actual length of the cover 42 is sufficient to cover not only the bellows 20 but extends to cover also the support rings 25 and 34 so that the cover 42 provides protection for the bellows against scratches and dents which would reduce the life cycle of bellows. Since the surfaces 29 and 38 of the support rings make substantially a line contact with the inner spherical surface 41 of the shield the conduit sections 11 and 12 can gimbal in any angular plane while continuing to support the shield 42. Also, because of the engagement of the surfaces 29 and 38 with the interior of the cover 42, the support rings 26 and 35 take up axial loads on the joints and prevent axial expansion of the joint under axial load in tension so that such loads will not be transmitted to the bellows.

A Marcel spring type spacer 52 is located between the flanges 45 and 46 and biases the halves 43 and 44 apart, as illustrated in FIGURE 3. By adjusting the nuts 53 in the bolts 47, the flanges 45 and 46 can be moved closer together against the force of the spring or further apart by the action of the spring in order to vary the spacing between the flanges. The bolts 47 pass pass through openings in the springs in order to retain the springs in place between the flanges. As illustrated in FIGURE 4, the nut 53 is threaded along the bolt 47 to provide a narrower distance between the flanges 45 and 46 than in FIGURES 5 wherein the nut is threaded outwardly on the bolt 47 to provide a greater distance between the flanges 45 and 46. When the distance between the flanges is increased as in FIGURE 5, the circular lines of engagement between the support rings and the inner surface of the shield move further apart to permit axial extension of the joint by permitting the ends of the conduit sections 11 and 12 to be further apart. It follows that when the flanges are close together as in FIGURE 4, the distance between the end of the conduits is reduced to shorten the length of the bellows 20. The edges 55 and 56 of the shield surround the conduit sections 11 and 12 and are larger in diameter than the sections to permit relative movement therebetween.

The shield device of the present invention generally provides physical protection for the bellows while in storage or in use. Any axial tension loads applied between the sections 11 and 12 will be taken up by the support rings 25 and 34 and will prevent axial tension load on the bellows itself. Also, each section of the bellows has a ball-type action with the inner spherical surface of the cover 42 to permit change in angular position of either section independently of the other in any direction. By moving the two parts 43 and 44 toward or away from each other by adjusting nuts 53 along bolts 47, a change in size of the cover 42 can be affected to produce a change in the axial length of the joint. This also permits the joint to be shortened or lengthened for assembly purposes.

It is understood that the spring 52 could be replaced by individual coil springs surrounding the bolts 47 and that the cover 42 could be made in more than two sections. Various other modifications are contemplated by those skilled in the art without departing from the spirit and scope of the invention hereinafter defined by the appended claims.

What is claimed is:

1. A shield device for a bellows joint in which a bellows extends between the adjacent ends of conduit sections to seal the ends while permitting gimbal movement between the sections comprising:
   a support member supported by and extending outwardly from each of said adjacent ends;
   an arcuate surface on each of said support members spaced outwardly from the supporting end;
   a shield member to carry tension loads surrounding said bellows and said support members, said shield member having a unitary inner surface in the shape of a portion of a sphere, said shield widening from its ends toward its center and said shield being split longitudinally into sections;
   fastening means for connecting adjacent sections of said shield;
   means located in said longitudinal split between adjacent shield sections for biasing said sections apart and thereby determine the axial length of the joint; and
   said arcuate surfaces of said support members engaging said inner spherical surface of said shield member to permit gimbal movement of each of said conduit sections and thereby provide a flexible moving joint at the bellows, while said widening unitary inner spherical surface permits unrestricted movement of said support members toward each other and away from said spherical surface to shorten said joint.

2. A shield device as defined in claim 1 wherein said means between said sections for biasing said sections apart comprises a Marcel spring held in location between said sections by said fastening means.

3. A shield device for bellows joints in which a bellows extends between adjacent ends of conduit sections to permit movement therebetween comprising:
   supported means supported at the end of each conduit section and having an outwardly extending flange;
   an arcuate surface on each of said flanges;
   a shield member to carry tension loads surrounding said bellows and said arcuate surfaces and having an inner surface in the form of a portion of a sphere;
   said shield being split longitudinally into sections;
   means for expanding and compressing said shield member transversely of said conduit section to vary the distance between the axis of contact of said arcuate surfaces with said shield member and thereby the axial distance between the ends of said conduit section, said means including fastening means for compressing said member together at said split and expanding spring means located at said split and engaging said sections on opposite sides of said split to expand said member;
   said arcuate surfaces engaging said inner surface of said shield member to limit separation of the ends of said conduit sections while permitting angular movement of said conduit sections about said arcuate surfaces; and
   said shield permitting movement of said flanges toward each other and away from the inner surface of said shield.

References Cited by the Examiner

UNITED STATES PATENTS

| 377,130 | 1/1888 | White | 285—367 X |
|---|---|---|---|
| 656,667 | 8/1900 | Schmid | 285—373 X |
| 1,568,043 | 1/1926 | Anderson | 24—279 X |
| 1,835,399 | 12/1931 | Hunziker | 285—420 X |
| 1,944,135 | 1/1934 | Dennis | 285—229 |
| 2,931,671 | 4/1960 | Beeley | 285—341 |

FOREIGN PATENTS

| 113,906 | 8/1929 | Austria. |
|---|---|---|
| 671,291 | 12/1929 | France. |
| 886,682 | 8/1953 | Germany. |
| 556,857 | 10/1943 | Great Britain. |
| 893,510 | 3/1962 | Great Britain. |
| 518,998 | 3/1955 | Italy. |

CARL W. TOMLIN, *Primary Examiner.*